(12) United States Patent
Böhm et al.

(10) Patent No.: US 8,639,728 B2
(45) Date of Patent: Jan. 28, 2014

(54) METHOD FOR COMPUTER ASSISTED PLANNING OF A TECHNICAL SYSTEM

(75) Inventors: Birthe Böhm, Nürnberg (DE); Norbert Gewald, Erlangen (DE); Raymond Kok, East Windsor, NJ (US); Thilo Tetzner, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 372 days.

(21) Appl. No.: 12/550,563

(22) Filed: Aug. 31, 2009

(65) Prior Publication Data

US 2011/0055150 A1 Mar. 3, 2011

(51) Int. Cl.
*G06F 17/30* (2006.01)
(52) U.S. Cl.
USPC .......................................... 707/803; 707/791
(58) Field of Classification Search
USPC .................................................. 707/790, 791
See application file for complete search history.

(56) References Cited

U.S. PATENT DOCUMENTS

2002/0173867 A1* 11/2002 Duncan et al. ................... 700/97
2005/0278670 A1* 12/2005 Brooks et al. ...................... 716/5

* cited by examiner

*Primary Examiner* — Syed Hasan

(57) ABSTRACT

A method for computer assisted planning of a technical system with a first structure of multi-category objects is provided. Each multi-category object describes a technical component and includes a plurality of facets. Each facet is of a specific category and refers to information about the technical component. Categories of a multi-category object refer to different disciplines for designing a technical system. The disciplines include mechanical, electrical and automation engineering. Further, a second structure of a specific category is provided and has category-specific elements. Each category-specific element describes a technical component with respect to the corresponding specific category. Each facet of a specific category of a multi-category object describing a technical component in the first structure is related to a category-specific element of the specific category describing the technical component in the second structure. The first and second structures are changeable by a user during planning of the technical system.

20 Claims, 2 Drawing Sheets

METHOD FOR COMPUTER ASSISTED PLANNING OF A TECHNICAL SYSTEM

FIELD OF INVENTION

The invention refers to a method for computer assisted planning of a technical system and a corresponding computer program product.

SUMMARY OF INVENTION

In computer assisted planning of technical systems, different categories are relevant for designing the components of the technical system. In the following, the term technical system has a broad meaning and covers industrial plants as well as technical products. Particularly, technical disciplines like mechanical engineering, electrical engineering and software engineering are involved in the design process of a technical system. The structure of the technical system with respect to the different disciplines are usually treated separately, thus resulting in a high overhead for the engineers working in the different disciplines in order to integrate the different discipline-specific structures in one common design of a technical system.

There are approaches to describe the technical components of a technical system by different categories based on multi-category objects. Each object represents a digital representation of a technical component and includes different aspects or facets which refer to corresponding categories, such as the above-mentioned engineering disciplines. However, there exists no concept up to now describing the integration of different disciplines during the planning of a technical system by the use of multi-category objects.

Therefore, it is an object of the invention to provide a computer assisted method enabling an easy and efficient integration of different categories describing aspects of a technical system in a common engineering process of the technical system.

This object is solved by the method or the computer program product as claimed in the independent claims. Preferred embodiments of the invention are defined in the dependent claims.

According to the method of the invention, a first structure of multi-category objects is provided, each multi-category object describing a technical component of a technical system to be planned and comprising a plurality of facets or aspects, each facet being of a specific category from a plurality of categories and referring to information about said technical component in the corresponding specific category of the facet. A category in the sense of the invention may be defined by arbitrary criteria and preferably refers to a discipline which is involved in the design process of a technical system. The disciplines specified by a category are not restricted to technical engineering disciplines but, for example, may also comprise disciplines with respect to financial aspects. However, the categories usually comprise one of the following technical domains:

mechanical engineering;
electrical engineering;
automation engineering.

According to the method of the invention, one or more second structures are provided, each second structure being of a specific category from said plurality of categories and comprising category-specific elements of the corresponding specific category of the second structure, each category-specific element describing a technical component of said technical system with respect to the corresponding specific category, where each facet of a specific category of a multi-category object describing a technical component in said first structure is related to a category-specific element of said specific category describing said technical component in the second structure of said specific category and where said first and second structures are changeable by user during planning of the technical system. The method of the invention keeps consistency in said first and second structures when changes are performed by a user in one or more of said first and second structures.

The method of the invention uses the concept of multi-category objects in order to integrate different categories in a process for engineering a technical system. To do so, corresponding relations between elements of category-specific structures and a common multi-category objects structure are established and mechanisms for keeping the data consistent in the different structures are implemented. According to the invention, the collaboration between engineers working in different disciplines is facilitated resulting in a fast and high quality engineering of a technical system. The method of the invention may be used for planning various technical systems, e.g. for planning a plant or machine for fabricating a product, where the technical components of the technical system comprise plant units and/or machine units for manufacturing and/or processing the product. E.g., the method of the invention may be used for computer assisted planning of an assembly line. Furthermore, the method of the invention may be used for planning a technical product, where the technical components are subunits of the product.

In a preferred embodiment of the invention, a facet of a specific category of a multi-category object describing a technical component in said first structure includes a category-specific element of said specific category describing said technical component in the second structure of said specific category. In this embodiment, the relation of a facet to a corresponding category-specific element is established by integrating the information of the category-specific element directly in the facet. As a consequence, consistency between a second structure and the first structure is implemented in an easy way because both structures work on the same objects. In other words, a change in a category-specific element in a second structure also affects the corresponding facet and vice versa, because the facet includes the category-specific element.

In another embodiment of the invention, a facet of a specific category of a multi-category object describing a technical component in said first structure is linked to a category-specific element of said specific category describing said technical component in the second structure of said specific category. In this embodiment, the facets and the category-specific elements are separate objects.

In another embodiment of the invention, a facet of a multi-category object describing a technical component in said first structure is assigned to a category-specific element of said specific category describing said technical component in the second structure of said specific category by using a reference from said multi-category object to said category-specific element and/or vice versa, particularly by using a unique identifier for said multi-category object and for said category-specific element. The use of such a reference or unique identifier provides an easy mechanism for checking the consistency between different structures.

In another preferred embodiment of the invention, the consistency in said first and second structures is kept by synchronizing the changes performed by a user in one or more of said first and second structures with the other first and second structures. The synchronization may be conducted directly after a change is performed. However, the consistency may also be kept by synchronizing the changes in regular time intervals or triggered by predefined events or triggered manually by a user. In order to implement an efficient synchronizing mechanism, the step of synchronizing comprises the step of notifying changes performed by a user in one or more of said first and second structures to the other first and second structures.

In another embodiment of the invention, the first structure is an instance structure where the multi-category objects are instances. Those instances particularly refer to instances being instantiated from types or templates in a library. However, an instance may also refer to a dummy in case that an appropriate type or template cannot be found. Furthermore, an instance preferably includes parameters being adjusted by a user. However, an instance may also be a black box including predefined parameters which cannot be adjusted by the user.

In another embodiment of the invention, one or more of the second structures may also be instance structures where category-specific elements are instances. Analogously to the aforementioned embodiment, the instances are preferably instances instantiated from types or templates in a library. However, an instance may also be a dummy in case that there is no appropriate type or template in the library. Furthermore, an instance preferably includes parameters being adjusted by a user. However, an instance may also refer to a black box including predefined parameter which cannot be adjusted by a user.

The first and the second structures may be provided by different category-specific software tools for planning technical systems. However, it is also possible that the first and second structures are provided by one software tool for all structures.

In another preferred embodiment of the invention, at least one of the first and second structures can be visualized and changed on one or more user interfaces, e.g. based on a corresponding CAD program. This enables an easy category-specific design for the technical system. Particularly, the first and second structures may be visualized and changed on a common single user interface. Alternatively, for each of the first and second structures a separate user interface for visualizing and changing the respective structures may be provided.

Besides the above method, the invention also refers to a computer program product directly loadable into the internal memory of a digital computer, comprising software code portions for performing the method of the invention when the program is run on a computer.

BRIEF DESCRIPTION OF THE DRAWINGS

Embodiments of the invention will now be described with respect to the accompanying drawings wherein.

DETAILED DESCRIPTION OF INVENTION

Figure 1:
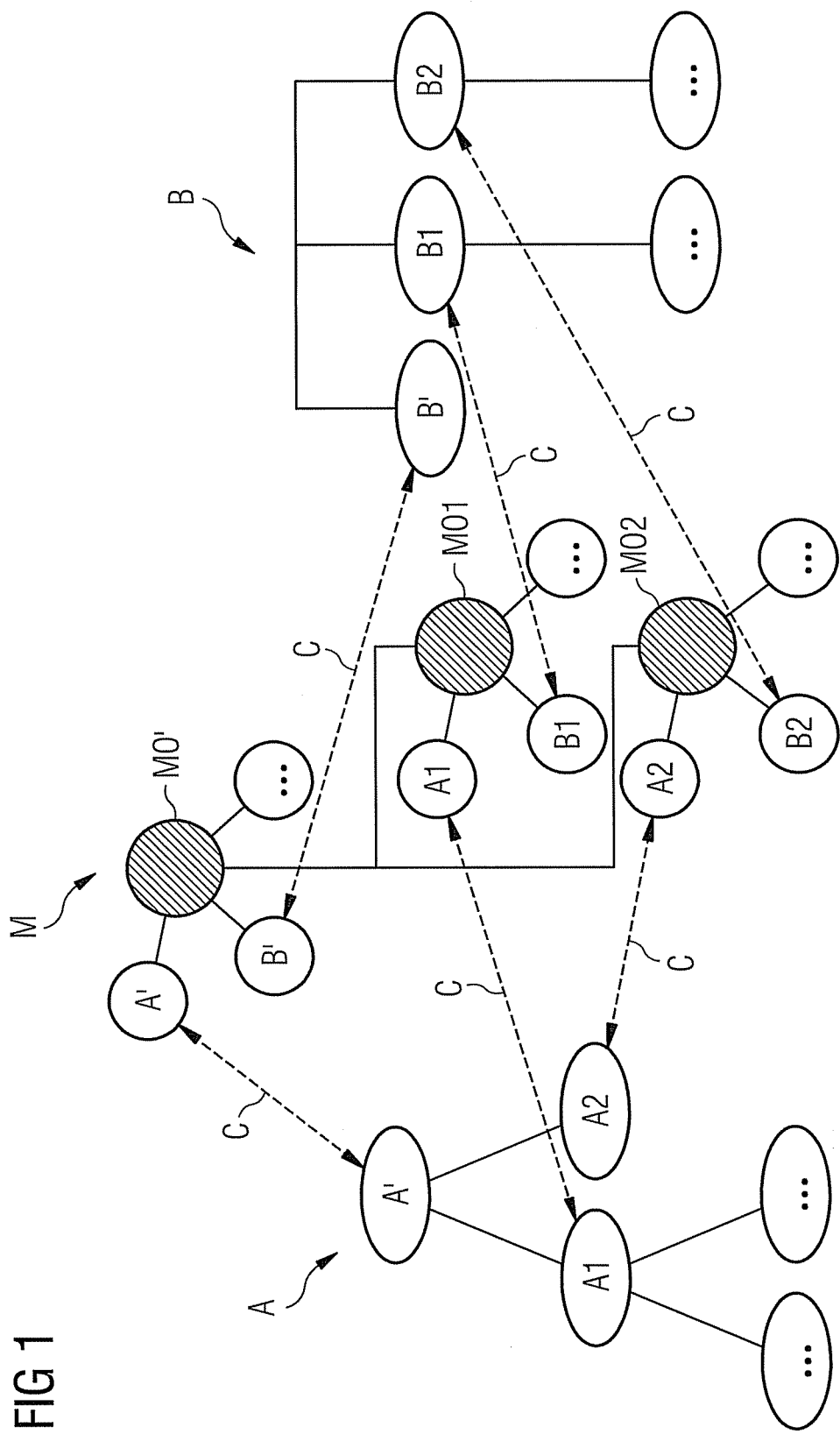
FIG. 1 shows a schematic diagram illustrating the parallel use of different structures according to an embodiment of the invention.

FIG. 1 illustrates a diagram showing an implementation of different structures in a computer program for planning a technical system. The technical system may refer to a plant for fabricating a product, e.g. to an assembly line. The technical system is described by a plurality of technical components being part of the technical system, such as robots, conveyors, motors or any other parts in the technical system. Those technical components are usually designed by engineers who work in different disciplines. Particularly, one discipline usually refers to the mechanical design of the technical components, another discipline refers to the electrical design of the technical components and yet another discipline refers to the software automation of the technical components. However, the disciplines may also refer to non-technical domains, such as financial planning and the like. Usually, the design of the technical system is performed by engineers separately for each of the disciplines. According to the invention as described in the following, an integration of the different disciplines is achieved such that engineers working in different disciplines on the same technical system can collaborate efficiently.

In the following, the method of the invention is described based on the use of so-called mechatronics objects describing the components of a technical system on a higher level of engineering than in the corresponding technical disciplines. According to FIG. 1, the basic structure of the technical system is described based on a mechatronics objects instance structure M. This structure is usually drafted by a person coordinating the planning of a technical system. The structure is drafted by using a software tool and it includes in the example of FIG. 1 three mechatronics objects MO', MO1 and MO2, each object referring to a technical component of a technical system. The structure M indicates that the technical component represented by mechatronics structure MO' consists of two sub-components represented by mechatronics objects MO1 and MO2. The mechatronics objects in the instance structure are instances of corresponding templates or types which are part of a library. A user can extract corresponding types from the library to instantiate them in the instance structure M. Hence, the templates or types in the library may be used several times when drafting a mechatronics objects instance structure.

Each mechatronics object of the structure M comprises so-called facets or aspects referring to different categories in the form of technical disciplines. In FIG. 1, the mechatronics objects are shown as big hatched circles and the corresponding facets of these objects are indicated as smaller circles connected by lines to the big circle. Particularly, the mechatronics object MO' includes the facets A' and B', the mechatronics object MO1 includes the facets A1 and B1 and the mechatronics object MO2 includes the facets A2 and B2. A mechatronics object in the structure M may include many more facets. This is schematically indicated by corresponding circles including three dots.

Besides the mechatronics objects instance structure M, the computer program implementing the method of the invention enables the parallel use of discipline-specific structures. FIG. 1 shows a discipline-specific structure A representing a first discipline and a discipline-specific structure B representing a second discipline. The facets A', A1 and A2 all refer to the first discipline, e.g. mechanical engineering, and the facets B', B1 and B2 all refer to the second discipline, e.g. electrical engineering. Each facet refers to data for the corresponding discipline and each mechatronics object includes a facet for each discipline.

The discipline-specific structures A and B show the discipline-specific design of the technical system based on corresponding category-specific elements. Those elements are shown in FIG. 1 as ellipses and have reference numerals corresponding to the facets of the structure M. Particularly, the structure A includes discipline-specific elements A', A1, A2 and further elements indicated by two ellipses including three dots. Analogously, the discipline-specific structure B includes discipline-specific elements B', B1, B2 and further elements which are schematically indicated by two ellipses including three dots.

Engineers of the corresponding discipline work on the discipline-specific structures A and B in parallel. However, each discipline-specific structure is related to the common mechatronics objects instance structure M. I.e., the facets of the mechatronics objects in the structure M are related to corresponding discipline-specific elements providing discipline-specific information for the corresponding mechatronics object. The relations between discipline-specific elements in each of the structures A and B and the corresponding facets in the structure M are indicated by dashed double arrows which are designated by reference numeral C.

There are different ways to relate the discipline-specific elements to the facets. In one embodiment of the invention, a facet already includes the corresponding discipline-specific element. I.e., the facet and the discipline-specific element refer to the same object. Hence, engineers in the specific structure directly use the facet of the mechatronics objects. In another embodiment of the invention, the discipline-specific elements in the discipline-specific structures refer to separate elements which are linked to the respective facets in the mechatronics objects instance structure M. Corresponding links may be established in the process of instantiating mechatronics objects in the structure M. In other words, discipline-specific elements for each discipline are stored with the corresponding type or template of a mechatronics object in a library and are instantiated with the mechatronics object. Alternatively, the links may be established manually or based on automated rules.

As mentioned before, different engineers usually design the technical components in the different structures A, B and M. According to the method of the invention, consistency is kept between the different structures when changes are performed by the engineers. In case that the discipline-specific elements are integrated in the corresponding facets of the mechatronics objects instance structure, the consistency between a discipline-specific structure and the mechatronics objects instance structure is kept automatically because manipulations are made in the same objects. The consistency between the different structures may also be kept by automatic synchronization mechanisms. Due to such a mechanism, a change performed in an element or facet in one of said structures is automatically implemented in the corresponding element or facet in the other structures. The synchronization may be performed directly after a change in one structure. However, the synchronization may also be implemented in regular time intervals or at specific synchronization points or events. The synchronization may be based on a change notification mechanism which notifies a change performed in one structure to the other structures.

Figure 2:
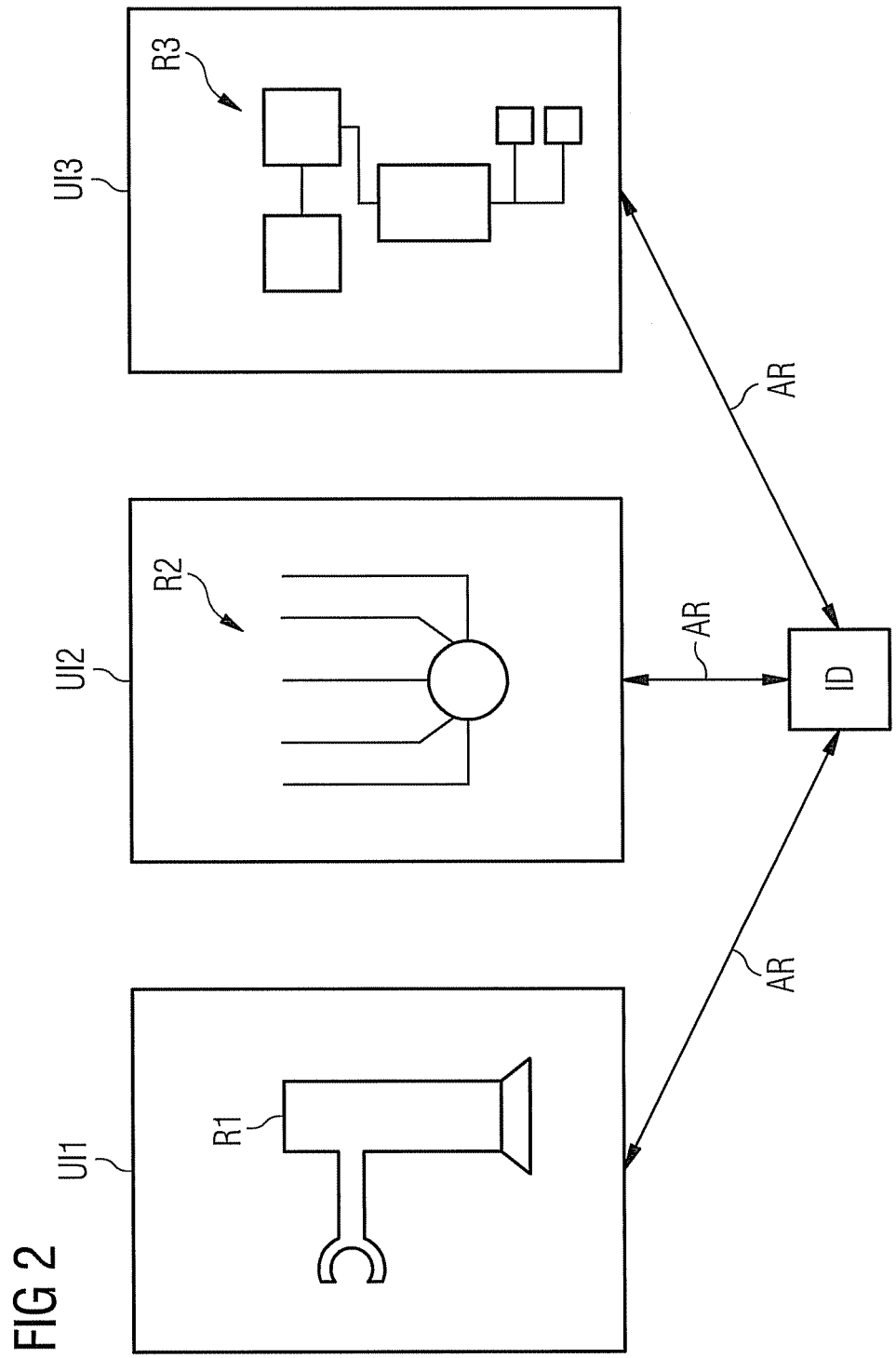
FIG. 2 shows a diagram illustrating a connection between tools of different disciplines according to an embodiment of the invention.

FIG. 2 shows a diagram explaining an embodiment of a mechanism to keep consistency between the structures of different engineering disciplines. FIG. 2 shows three user interfaces UI1, UI2 and UI3 being based on different discipline-specific structures. Particularly, user interface UI1 refers to mechanical engineering, user interface UI2 to electrical engineering and user interface UI3 to automation engineering. FIG. 2 shows a scenario where a technical component in the form of a robot for an assembly line is to be planned in the different disciplines. Each of the user interfaces UI1 to UI3 shows a different technical view on the robot. Particularly, user interface UI1 is a view on the mechanical layout R1 of the robot. This interface shows a 3D model of the robot with its kinematic behaviour. On user interface UI2, the electrical layout R2 of the robot is shown. This interface includes the connections of the robot in a single line diagram. User interface UI3 provides a software controller view R3 comprising software components controlling the robot. All user interfaces refer to the same robot but provide different discipline-specific views on the robot. The discipline-specific structures on which each of the user interfaces are based are connected to a common mechatronics objects instance structure which has been described with respect to FIG. 1.

In order to ensure consistency between the different disciplines indicated in FIG. 2, a unique identifier ID for the robot is used in all different disciplines and in the mechatronics objects instance structure. I.e., the mechatronics object of the robot in the mechatronics objects instance structure is identified by the same identifier as the corresponding discipline-specific element in the discipline-specific structures on which the user interfaces in FIG. 2 are based. The use of the same unique identifier ID for the robot in all disciplines is indicated in FIG. 2 by corresponding double arrows AR connecting the identifier ID with each of the user interfaces UI1, UI2 and UI3. Based on the unique identifier, a change in the technical design of a robot in one discipline can be identified in the corresponding mechatronics object and in the other disciplines. Consequently, synchronization can be established between the discipline-specific structures and the mechatronics objects instance structure.

The method of the invention is implemented by corresponding tools participating in engineering a technical system. To do so, one overall tool may be used for designing the technical system in the different disciplines. This tool manages all the different structures and ensures consistency between the structures. However, different tools for each discipline may be used. In this case, at least one tool is provided which can deal with the common mechatronics objects instance structure which is related with the other structures. Furthermore, a synchronization mechanism is provided between the tools in order to ensure consistency.

The invention as described in the foregoing has several advantages. Particularly, the use of mechatronics objects on a higher level of engineering enables the integration of different disciplines in a single process for planning a technical system. This results in a better quality and faster engineering of a technical system. According to the method of the invention, it is possible to use existing discipline-specific structures and connect them to a mechatronics objects structure. Hence, the translation to a full mechatronic integration can be done step by step.

The invention claimed is:

1. A method of computer assisted planning of a technical system comprising technical components, wherein the design of each technical component spans across a plurality of disciplines, comprising:

creating a first high level data structure by linking a plurality of multi-category objects MO comprising digital representations of objects and related sub-objects in the first high level data structure of multi-category objects to produce a common mechatronics objects instance structure M, each multi-category object MO describing a technical component of a technical system and comprising a plurality of facets A', B' . . . N', each facet being of a different specific category from a plurality of categories representing each of the plurality of disciplines involved in the design of the technical component and referring to information about the technical component in the corresponding specific category of the facet, wherein each multi-category object MO is described in a higher level of engineering than in a corresponding discipline;

creating a plurality of second structures A, B, ... N separate from the first high level structure M, each second structure A, B, ... N being a discipline-specific structure of a different specific category from the plurality of categories enabling parallel use of the second structures and comprising linked category-specific elements, each category-specific element describing a technical component of the technical system with respect to the corresponding specific category, establishing a relation between each facet A', B' ... N' of a specific category of each multi-category object MO describing a technical component in the first structure M and a corresponding category-specific element of the specific category describing the technical component in the corresponding second structure A, B, ... N of the specific category, wherein each of the plurality of second structures A, B, ... N is connected to the common mechatronics objects instance structure M respectively through the plurality of facets A', B' ... N';

wherein the common mechatronics objects instance structure M and the second structures A, B, ... N are changeable by a user during planning of the technical system; and keeping consistency in the common mechatronics objects instance structure M and the second structures A, B, ... N via the relation when changes are performed by the user in the common mechatronics objects instance structure M or the second structures A, B, ... N.

2. The method according to claim 1, wherein the plurality of categories comprises one or more of the domains mechanical engineering, electrical engineering, automation engineering.

3. The method according to claim 1, wherein the technical system refers to a plant or machine for fabricating a product, and wherein the technical components of the technical system include elements selected from the group consisting of plant units, machine units for manufacturing, processing the product, and a combination thereof.

4. The method according to claim 1, wherein the technical system refers to a product, and wherein the technical components are subunits of the product.

5. The method according to claim 1, wherein the facet of the multi-category object MO describing a technical component in the first structure and category-specific element of the specific category describing the technical component in the second structure of the specific category refer to the same object in that the category-specific element is integrated in its corresponding facet of the common mechatronics objects instance structure MO, thereby automatically providing the relation.

6. The method according to claim 1, wherein the facet of the multi-category object MO describing a technical component in the first structure and the category-specific element of the specific category describing the technical component in the second structure of the specific category comprise separate objects that are linked, the linking being established during a process of instantiating the corresponding facet in the common mechatronics objects instance structure MO, thereby providing the relation.

7. The method according to claim 1, wherein the facet of the multi-category object MO describing a technical component in the first structure and the category-specific element of the specific category describing the technical component in the second structure of the specific category comprise separate objects that are linked by using a reference from the multi-category object MO to the category-specific element and/or vice versa, particularly by using a unique identifier for the multi-category object MO and for the category-specific element, thereby providing the relation.

8. The method according to claim 1, wherein consistency in the first and second structures is kept by synchronizing the changes performed by a user in one or more of the first and second structures with the other first and second structures.

9. The method according to claim 8, wherein the synchronizing is conducted directly after a change is performed or in regular time intervals or triggered by predefined events or triggered manually by a user.

10. The method according to claim 8, wherein the synchronizing comprises the step of notifying changes performed by a user in one or more of the first and second structures to the other first and second structures.

11. The method according to claim 9, wherein the synchronizing comprises the step of notifying changes performed by a user in one or more of the first and second structures to the other first and second structures.

12. The method according to claim 1, wherein the first structure is an instance structure comprising instances of multi-category objects MO.

13. The method according to claim 1, wherein the second structure is an instance structure comprising instances of category-specific elements.

14. The method according to claim 1, wherein the first and second structures are provided by different category-specific software tools for planning technical systems.

15. The method according to claim 1, wherein the first and second structures are provided by one software tool for all structures.

16. The method according to claim 1, wherein the technical components of the first and second structures are visualized and changed on a user interface that provides discipline-specific views of the technical components.

17. A non-transitory computer readable medium storing a computer program directly loadable into an internal memory of a digital computer, comprising software code portions for performing, when run on a computer, a method of computer assisted planning of a technical system comprising technical components, wherein the design of each technical component spans across a plurality of disciplines, the method comprising:

creating a first high level data structure by linking a plurality of multi-category objects MO comprising digital representations of objects and related sub-objects in the first high level data structure of multi-category objects MO to produce a common mechatronics objects instance structure M, each multi-category object MO describing a technical component of a technical system and comprising a plurality of facets A', B' ... N', each facet being of a different specific category from a plurality of categories representing each of the plurality of disciplines involved in the design of the technical component and referring to information about the technical component in the corresponding specific category of the facet, wherein each multi-category object MO is described in a higher level of engineering than in a corresponding discipline;

creating a plurality of second structures A, B, ... N separate from the first high level structure M, each second structure A, B, ... N being a discipline-specific structure of a different specific category from the plurality of categories enabling parallel use of the second structures and comprising linked category-specific elements, each category-specific element describing a technical component of the technical system with respect to the corresponding specific category, establishing a relation between each facet A', B' ... N' of a specific category of a multi-category object MO describing a technical component in the first structure and a category-specific element of the specific category describing the technical component in the corresponding second structure A, B, ... N of the specific category, each of the plurality of second structures A, B, ... N is connected to the common mechatronics objects instance structure M respectively through the plurality of facets A', B' ... N';

wherein the common mechatronics objects instance structure M and the second structures A, B, ... N are changeable by a user during planning of the technical system; and keeping consistency in the common mechatronics objects instance structure M and the second structures A, B, ... N via the relation when changes are performed by the user in the common mechatronics objects instance structure M and the second structures A, B, ... N.

18. The computer readable medium according to claim 17, wherein the plurality of categories comprises one or more of the domains mechanical engineering, electrical engineering, automation engineering.

19. The computer readable medium according to claim 17, wherein the technical system refers to a plant or machine for fabricating a product, and wherein the technical components of the technical system include elements selected from the group consisting of plant units, machine units for manufacturing, processing the product, and a combination thereof.

20. The computer readable medium according to claim 17, wherein the technical system refers to a product, and wherein the technical components are subunits of the product.

* * * * *

UNITED STATES PATENT AND TRADEMARK OFFICE
CERTIFICATE OF CORRECTION

PATENT NO.          : 8,639,728 B2                                       Page 1 of 1
APPLICATION NO.     : 12/550563
DATED               : January 28, 2014
INVENTOR(S)         : B☐hm et al.

It is certified that error appears in the above-identified patent and that said Letters Patent is hereby corrected as shown below:

Title Page, item (73)

Assignee should read:

Siemens Aktiengesellschaft, München, GERMANY and
Siemens Product Lifecycle Management Software Inc., Plano, TEXAS Signed and Sealed this
Twenty-fourth Day of May, 2016

Michelle K. Lee
*Director of the United States Patent and Trademark Office*